(12) United States Patent
Sun et al.

(10) Patent No.: US 10,608,259 B2
(45) Date of Patent: Mar. 31, 2020

(54) LITHIUM-AIR SECONDARY BATTERY AND METHOD OF MANUFACTURING THE SAME

(71) Applicant: IUCF-HYU (INDUSTRY-UNIVERSITY COOPERATION FOUNDATION HANYANG UNIVERSITY), Seoul (KR)

(72) Inventors: Yangkook Sun, Seoul (KR); Wonjin Kwak, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 257 days.

(21) Appl. No.: 15/477,793

(22) Filed: Apr. 3, 2017

(65) Prior Publication Data

US 2017/0207462 A1     Jul. 20, 2017

Related U.S. Application Data

(63) Continuation of application No. PCT/KR2015/010430, filed on Oct. 2, 2015.

(30) Foreign Application Priority Data

Oct. 2, 2014   (KR) .................. 10-2014-0132953

(51) Int. Cl.
*H01M 4/88* (2006.01)
*H01M 4/90* (2006.01)
(Continued)

(52) U.S. Cl.
CPC ............. *H01M 4/88* (2013.01); *H01M 4/382* (2013.01); *H01M 4/8807* (2013.01);
(Continued)

(58) Field of Classification Search
CPC ........ H01M 4/88; H01M 4/90; H01M 4/8828; H01M 4/8807
See application file for complete search history.

(56) References Cited

U.S. PATENT DOCUMENTS

2011/0091777 A1*   4/2011   Mizuno ................. H01M 4/131
                                                                  429/403
2014/0106240 A1    1/2014   Kotani et al.

FOREIGN PATENT DOCUMENTS

JP    2014-82064 A      5/2014
KR    10-2013-0036293 A   4/2013
KR    10-2013-0093077 A   8/2013

OTHER PUBLICATIONS

A. V. Vasilevich, et al., "Synthesis and Characterization of Massive Molybdenum Carbides and Supported Carbide-Containing Catalysts $Mo_2C/C$ Prepared through Mechanical Activation", Catalysis in Industry, 2004, pp. 8-16, vol. 6, No. 1.

(Continued)

*Primary Examiner* — Ula C Ruddock
*Assistant Examiner* — Frank A Chernow
(74) *Attorney, Agent, or Firm* — Sughrue Mion, PLC (57) ABSTRACT

A method of manufacturing a lithium-air secondary battery is provided. The method includes preparing molybdenum oxide and a carbon structure, pulverizing and mixing the molybdenum oxide and the carbon structure by performing a ball-milling process on the molybdenum oxide and the carbon structure, and manufacturing molybdenum carbide by carburizing the molybdenum oxide with the carbon structure.

9 Claims, 12 Drawing Sheets
(1 of 12 Drawing Sheet(s) Filed in Color)

(51) Int. Cl.
*H01M 12/08* (2006.01)
*H01M 4/38* (2006.01)
(52) U.S. Cl.
CPC .......... *H01M 4/8828* (2013.01); *H01M 4/90* (2013.01); *H01M 12/08* (2013.01); *Y02E 60/128* (2013.01)

(56) References Cited

OTHER PUBLICATIONS

International Search Report for PCT/KR2015/010430 dated Jan. 27, 2016 [PCT/ISA/210].

\* cited by examiner

LITHIUM-AIR SECONDARY BATTERY AND METHOD OF MANUFACTURING THE SAME

CROSS-REFERENCE TO RELATED APPLICATION

This application is a continuation of pending International Application No. PCT/KR2015/010430, which was filed on Oct. 2, 2015 and claims priority to Korean Patent Application No. 10-2014-0132953, filed on Oct. 2, 2014, in the Korean Intellectual Property Office, the disclosures of which are hereby incorporated by reference in their entireties.

BACKGROUND

1. Field

Embodiments of the inventive concepts relate to a lithium-air secondary battery and a method of manufacturing the same and, more particularly, to a lithium-air secondary battery having a positive electrode including molybdenum carbide and a method of manufacturing the same.

2. Description of the Related Art

Secondary batteries capable of storing electric energy have been increasingly demanded with the development of portable mobile electronic devices such as smart phones, MP3 players, and tablet personal computers. In particular, lithium-air secondary batteries have been increasingly demanded with the development of electric cars, medium and large energy storage systems, and portable devices requiring a high energy density.

The lithium-air secondary battery may include a lithium negative electrode, a lithium ion conductive electrolyte, and an air electrode in which a reversible electrochemical reaction of oxygen and lithium ions occurs. The lithium-air secondary battery has a high theoretical energy density of 11,140 Wh/kg, and thus it can provide a higher energy density than currently used lithium ion batteries.

In addition, the lithium-air secondary batteries may be cheaper and more environmentally friendly than conventional lithium ion batteries, and stability of the lithium-air secondary batteries may be more than those of the conventional lithium ion batteries. Thus, the lithium-air secondary batteries are being actively researched and developed as power sources for electric cars.

For example, Korean Patent Publication No. 10-2012-0105736 (Application No. 10-2011-0023359, Applicant: Korea Institute Of Science And Technology) discloses a method of manufacturing a carbon-based positive electrode for a lithium-air battery. In this method, a composition which includes a binder resin and carbon powder having a surface area of 500 $m^2/g$ to 2000 $m^2/g$ and a porosity of 0.5 $cm^3/g$ to 5 $cm^3/g$ is injected into pores of a porous current collector in order that the carbon-based positive electrode provides optimal pores which smoothly causes an oxidation reaction of lithium.

Carbon used as a positive electrode of the lithium-air secondary battery may have excellent conductivity, a low cost, and a wide surface area. However, if carbon is used alone in the positive electrode, the carbon may be decomposed in charging/discharging processes to cause a side reaction.

SUMMARY

Embodiments of the inventive concepts may provide a highly reliable lithium-air secondary battery and a method of manufacturing the same.

Embodiments of the inventive concepts may also provide a lithium-air secondary battery with improved charge/discharge efficiency and a method of manufacturing the same.

Embodiments of the inventive concepts may further provide a method of manufacturing a lithium-air secondary battery, which is capable of simplifying manufacturing processes and of reducing a manufacture cost.

In an aspect, a method of manufacturing a lithium-air secondary battery may include preparing molybdenum oxide and a carbon structure, pulverizing and mixing the molybdenum oxide and the carbon structure by performing a ball-milling process on the molybdenum oxide and the carbon structure, and manufacturing molybdenum carbide by carburizing the molybdenum oxide with the carbon structure.

In some embodiments, the manufacturing of the molybdenum carbide may include manufacturing a composite in which the molybdenum carbide and the carbon structure are combined with each other.

In some embodiments, the manufacturing of the molybdenum carbide and the composite may include thermally treating the carbon structure and the molybdenum oxide.

In some embodiments, the thermal treating of the carbon structure and the molybdenum oxide may be performed in an inert gas atmosphere.

In some embodiments, the method may further include manufacturing slurry using the composite, and applying the slurry to a gas diffusion layer.

In some embodiments, the ball-milling process may be performed on the molybdenum oxide and the carbon structure in an inert gas atmosphere.

In an aspect, a lithium-air secondary battery may include a negative electrode including lithium, a positive electrode using oxygen as a positive electrode active material, the positive electrode including a composite in which molybdenum carbide and a carbon structure are combined with each other, and an electrolyte between the positive electrode and the negative electrode.

In some embodiments, the carbon structure may include at least one of carbon nanotube (CNT), graphite, super P carbon, vulcan carbon, graphene, reduced graphene oxide, or activated carbon.

In some embodiments, a diameter of the molybdenum carbide may range from 20 nm to 100 nm.

In some embodiments, the molybdenum carbide may be manufactured by a chemical carburization process using the carbon structure.

In an aspect, a method of manufacturing a positive electrode of a lithium-air secondary battery may include preparing molybdenum oxide and carbon nanotube, ball-milling the molybdenum oxide and the carbon nanotube to pulverize and mix the molybdenum oxide and the carbon nanotube, thermally treating the pulverized and mixed molybdenum oxide and carbon nanotube to manufacture molybdenum carbide and a composite in which the molybdenum carbide is combined with the carbon nanotube, mixing the composite with a binder to manufacture slurry, and applying the slurry to a gas diffusion layer.

In some embodiments, the molybdenum oxide may be chemically carburized by the carbon nanotube to manufacture the molybdenum carbide.

In some embodiments, generation and decomposition of $Li_2O_2$ occurring in charging/discharging processes may be accelerated by the composite.

In some embodiments, a surface area of the composite may be equal to or greater than 500 $m^2/g$, and a pore volume of the composite may be equal to or greater than 4 cc/g.

In some embodiments, a diameter of the molybdenum carbide may range from 20 nm to 100 nm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

Figure 1:
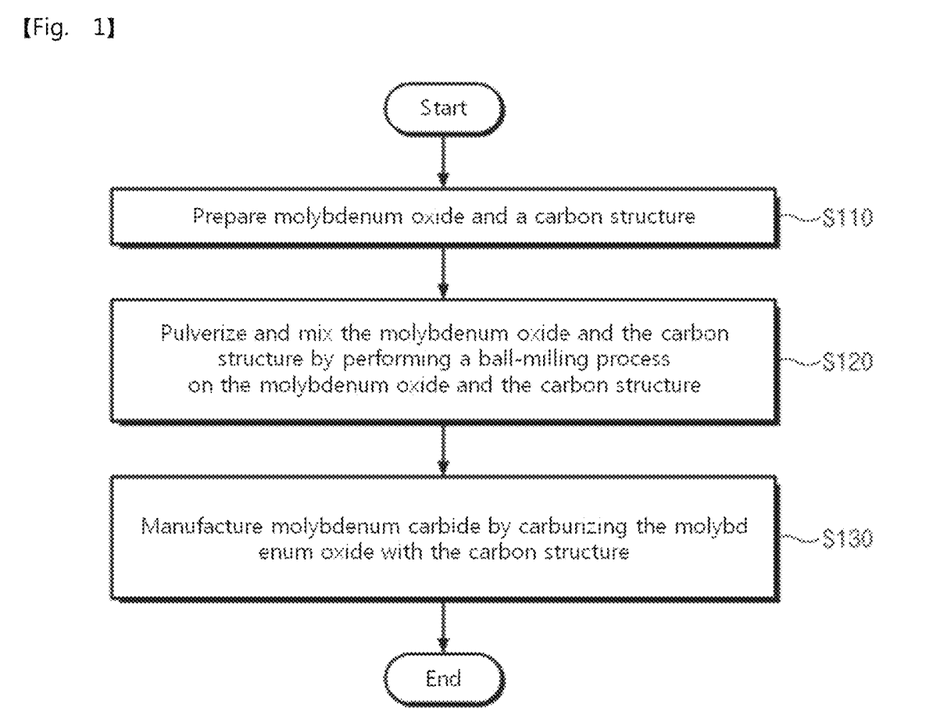
FIG. 1 is a flow chart illustrating a method of manufacturing a composite of molybdenum carbide and a carbon structure, which is included in a lithium-air secondary battery according to some embodiments of the inventive concepts.

FIG. 1 is a flow chart illustrating a method of manufacturing a composite of molybdenum carbide and a carbon structure, which is included in a lithium-air secondary battery according to some embodiments of the inventive concepts.

Referring to FIG. 1, molybdenum oxide and a carbon structure are prepared (S110). For example, the carbon structure may include at least one of carbon nanotube (CNT), graphite, super P carbon, vulcan carbon, graphene, reduced graphene oxide, or activated carbon. For example, the molybdenum oxide may be $MoO_3$.

A ball-milling process may be performed on the molybdenum oxide and the carbon structure to pulverize and mix the molybdenum oxide and the carbon structure (S120). The ball-milling process may be performed on the molybdenum oxide and the carbon structure in an inert gas atmosphere (e.g., an argon atmosphere).

According to some embodiments, the amount (e.g., a weight) of the molybdenum oxide pulverized and mixed by the ball-milling process may be more than the amount (e.g., a weight) of the carbon structure pulverized and mixed by the ball-milling process. Alternatively, the amount (e.g., the weight) of the molybdenum oxide pulverized and mixed by the ball-milling process may be equal to or less than the amount (e.g., the weight) of the carbon structure pulverized and mixed by the ball-milling process.

After the carbon structure and the molybdenum oxide are pulverized and mixed with each other, the molybdenum oxide may be carburized with the carbon structure to manufacture molybdenum carbide (S130). For example, the molybdenum carbide may be $Mo_2C$. In some embodiments, the carburization of the molybdenum oxide may include thermally treating the carbon structure and the molybdenum oxide. For example, the carbon structure and the molybdenum oxide may be thermally treated at about 950 degrees Celsius for one hour.

The molybdenum oxide may be combined with the carbon structure and may be chemically carburized with the carbon structure, and thus the molybdenum carbide may be manufactured. As a result, a composite in which the molybdenum carbide is combined with the carbon structure may be manufactured together with the molybdenum carbide.

Slurry may be manufactured using the composite. In some embodiments, the slurry may be manufactured by mixing the composite with a binder.

The slurry may be applied to a gas diffusion layer. For example, the gas diffusion layer may be formed of conductive carbon, stainless steel, aluminum, or nickel. The slurry applied to the gas diffusion layer may be vacuum-dried to manufacture a positive electrode of a lithium-air secondary battery.

Thereafter, a negative electrode may be disposed on the positive electrode, and an electrolyte and/or a separator may be disposed between the positive electrode and the negative electrode to manufacture a lithium-air secondary battery.

According to some embodiments of the inventive concepts, the molybdenum oxide and the carbon structure may be pulverized and mixed with each other by the ball-milling process, and then, the molybdenum oxide may be carburized with the carbon structure. Thus, the pulverized molybdenum oxide may be easily carburized with the pulverized carbon structure.

In addition, the composite may include both the molybdenum carbide and the carbon structure, and thus charge/discharge characteristics of the lithium-air secondary battery may be improved by a catalytic effect of each of the molybdenum carbide and the carbon structure and by various characteristics (e.g., conductivity and/or a structural characteristic of the carbon structure) according to a kind of the carbon structure.

Furthermore, according to the aforementioned embodiments of the inventive concepts, the molybdenum oxide may be combined with the carbon structure and may be chemically carburized with the carbon structure, and thus the molybdenum carbide may be manufactured. The molybdenum carbide may have a significantly smaller size, as compared with molybdenum carbide manufactured by ball-milling bulk molybdenum carbide (e.g., $Mo_2C$). For example, a diameter of the molybdenum carbide manufactured by ball-milling the bulk molybdenum carbide may be about 2 μm. On the other hand, a diameter of the molybdenum carbide manufactured according to the aforementioned embodiments of the inventive concepts may range from about 20 nm to 100 nm.

Thus, in the event that the composite of the molybdenum carbide and the carbon structure combined with each other is manufactured and the positive electrode of the lithium-air secondary battery is manufactured using the composite, the positive electrode may have a great surface area and a great pore volume and lithium oxide (e.g., $Li_2O_2$) may be easily generated and decomposed in charging/discharging processes of the lithium-air secondary battery. As a result, it is possible to provide the lithium-air secondary battery having improved charge/discharge characteristics, high efficiency, and high reliability and the method of manufacturing the same.

A lithium-air secondary battery including the composite of the molybdenum carbide and the carbon structure according to some embodiments of the inventive concepts will be described hereinafter.

Figure 2:
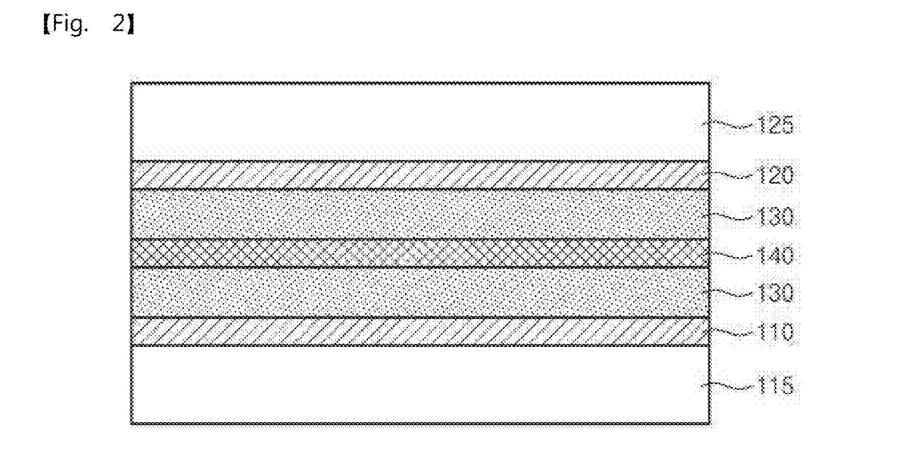
FIG. 2 is a schematic view illustrating a lithium-air secondary battery according to some embodiments of the inventive concepts.

FIG. 2 is a schematic view illustrating a lithium-air secondary battery according to some embodiments of the inventive concepts.

Referring to FIG. 2, a lithium-air secondary battery according to some embodiments of the inventive concepts may include a first current collector 115, a negative electrode 110, a positive electrode 120, a second current collector 125, an electrolyte 130, and a separator 140.

The negative electrode 110 may include lithium (Li). The negative electrode 110 may include lithium metal or an alloy of lithium and other metal. For example, the negative electrode 110 may include an alloy of lithium and one of carbon (C), silicon (Si), aluminum (Al), tin (Sn), magnesium (Mg), indium (In), and vanadium (V).

The first current collector 115 may be formed of a conductive material. For example, the first current collector 115 may be formed of copper, nickel, or stainless steel. The first current collector 115 may be coated with a cladding layer for preventing oxidation.

The positive electrode 120 may use oxygen ($O_2$) as a positive electrode active material. The positive electrode 120 may include the composite of the molybdenum carbide and the carbon structure combined with each other, which is described with reference to FIG. 1.

The second current collector 125 may be formed of a porous conductive material for easily supplying oxygen to the positive electrode 120. The second current collector 125 may be formed of conductive carbon, stainless steel, aluminum, or nickel. The second current collector 125 may correspond to the gas diffusion layer described with reference to FIG. 1.

The electrolyte 130 may be disposed between the negative electrode 110 and the positive electrode 120. The electrolyte 130 may include tetraethyleneglycol dimethylether (TEGDME), dimethyl sulfoxide (DMSO), or dimethoxyethane (DME), in which a lithium salt is dissolved. For example, the lithium salt may include at least one of $LiN(CF_3SO_2)_2$, $LiN(FSO_2)_2$, $LiN(C_2F_5SO_2)_2$, $LiC(CF_2SO_2)_3$, $LiBF_4$, $LiPF_6$, $LiClO_4$, $LiCF_3SO_3$, or $LiAsF_6$.

The separator 140 may include at least one of glass fiber, olefin-based resin, fluorine-based resin (e.g., polyvinylidene fluoride or polytetrafluoroethylene), ester-based resin (e.g., polyethylene terephthalate), or cellulose-based non-woven fabric. In certain embodiments, the separator 140 may be formed of at least one of other various kinds of materials except the examples described above.

Evaluation results of characteristics of the lithium-air secondary battery according to the aforementioned embodiments of the inventive concepts will be described hereinafter.

Manufacture of composites of molybdenum carbide and carbon structure and lithium-air secondary batteries according to embodiments As described with reference to the aforementioned embodiments of the inventive concepts, 2.8788 g of molybdenum oxide ($MoO_3$) and a carbon structure were injected into a ball-milling tube having a size of 100 ml, and 80 glass beads having a diameter of 0.5 cm were injected into the ball-milling tube. Subsequently, a ball-milling process was performed in an argon gas atmosphere at 300 rpm for 24 hours. Thereafter, the glass beads were separated from the molybdenum oxide and the carbon structure. Next, the molybdenum oxide and the carbon structure were heated in an argon gas atmosphere at a heating rate of 10° C./min, and then, the molybdenum oxide was carburized with the carbon structure at 950° C. for one hour, thereby manufacturing a composite of molybdenum carbide and the carbon structure.

Under the above conditions, composites according to first to sixth embodiments shown in the following table 1 were manufactured using carbon nanotube (CNT), graphite, super P carbon, vulcan carbon, reduced graphene oxide, and activated carbon as the carbon structures, respectively.

TABLE 1

| Classification | Kind of Composite |
| --- | --- |
| First embodiment | Composite of Carbon nanotube and $Mo_2C$ |
| Second embodiment | Composite of Graphite and $Mo_2C$ |
| Third embodiment | Composite of Super P carbon and $Mo_2C$ |
| Fourth embodiment | Composite of Vulcan carbon and $Mo_2C$ |
| Fifth embodiment | Composite of Reduced graphene oxide and $Mo_2C$ |
| Sixth embodiment | Composite of Activated carbon and $Mo_2C$ |

Each of the composites of the first to sixth embodiments was mixed with polyvinylidene fluoride (PVdF) at a weight ratio of 80:20 to manufacture slurry. The manufactured slurry was applied to a gas diffusion layer, and the slurry applied to the gas diffusion layer was vacuum-dried at 120° C. to manufacture a positive electrode.

Lithium-air secondary batteries according to first to sixth embodiments were manufactured using the positive electrodes manufactured using the composites of the first to sixth embodiments described above, negative electrodes using lithium foil, separators using glass fiber having a thickness of 260 μm, and electrolytes using TEGDME in which 1M of $LiCF_3SO_3$ is dissolved.

Manufacture of lithium-air secondary batteries according to comparative examples In comparative examples compared with the embodiments of the inventive concepts, lithium-air secondary batteries according to first to third comparative examples were manufactured using bulk molybdenum carbide powder pulverized by performing a ball-milling process on bulk molybdenum carbide ($Mo_2C$), carbon nanotube, and graphite by the same method as the first to sixth embodiments described above.

TABLE 2

| Classification | Constituent material of positive electrode |
| --- | --- |
| First comparative example | Bulk molybdenum carbide powder |
| Second comparative example | Carbon nanotube |
| Third comparative example | Graphite |

Figure 3A:
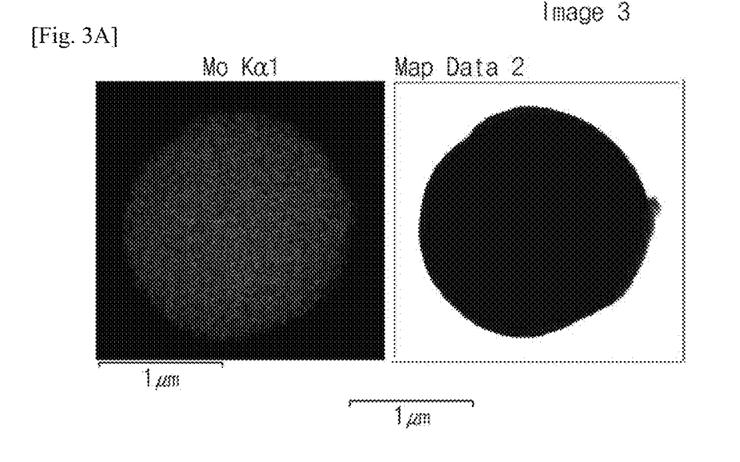
FIGS. 3A and 3B are diagrams illustrating a size of a composite included in a lithium-air secondary battery according to some embodiments of the inventive concepts.
Figure 3B:
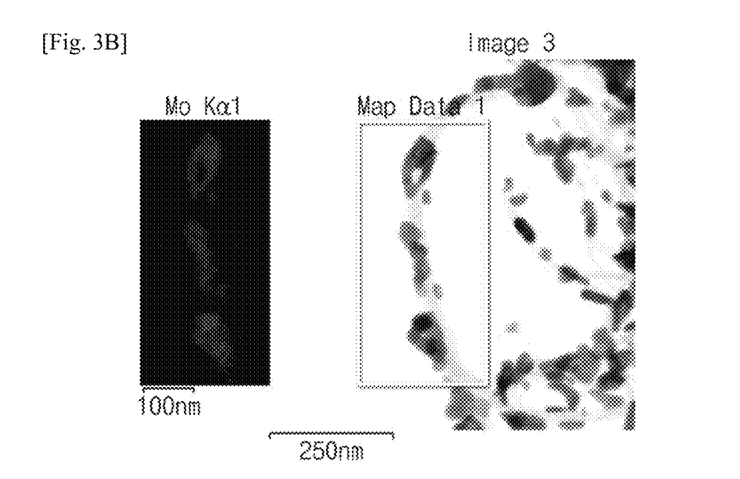

FIGS. 3A and 3B are diagrams illustrating a size of a composite included in a lithium-air secondary battery according to some embodiments of the inventive concepts.

FIG. 3A is a transmission electron microscopy (TEM) image showing the bulk molybdenum carbide powder pulverized by the first ball-milling process on the bulk molybdenum carbide in the first comparative example described above, and FIG. 3B is a TEM image showing the molybdenum carbide manufactured by carburizing the molybdenum oxide with the carbon nanotube in the first embodiment described above. Molybdenum elements were mapped using a red color through energy dispersive X-ray spectroscopy analysis.

In the case in which the bulk molybdenum carbide was pulverized by the ball-milling process in the first comparative example, a measured diameter of the pulverized molybdenum carbide was 2 μm. On the contrary, in the case in which the molybdenum oxide was carburized with the carbon nanotube to manufacture the molybdenum carbide after performing the ball-milling process on the molybdenum oxide and the carbon nanotube in the first embodiment, a measured diameter of the molybdenum carbide was in a range of about 20 nm to about 100 nm.

In other words, the molybdenum carbide manufactured by carburizing the molybdenum oxide with the carbon structure after ball-milling the molybdenum oxide and the carbon structure may have a significantly smaller size, as compared with the molybdenum carbide powder manufactured by pulverizing the bulk molybdenum carbide by the ball-milling process.

Figure 4:
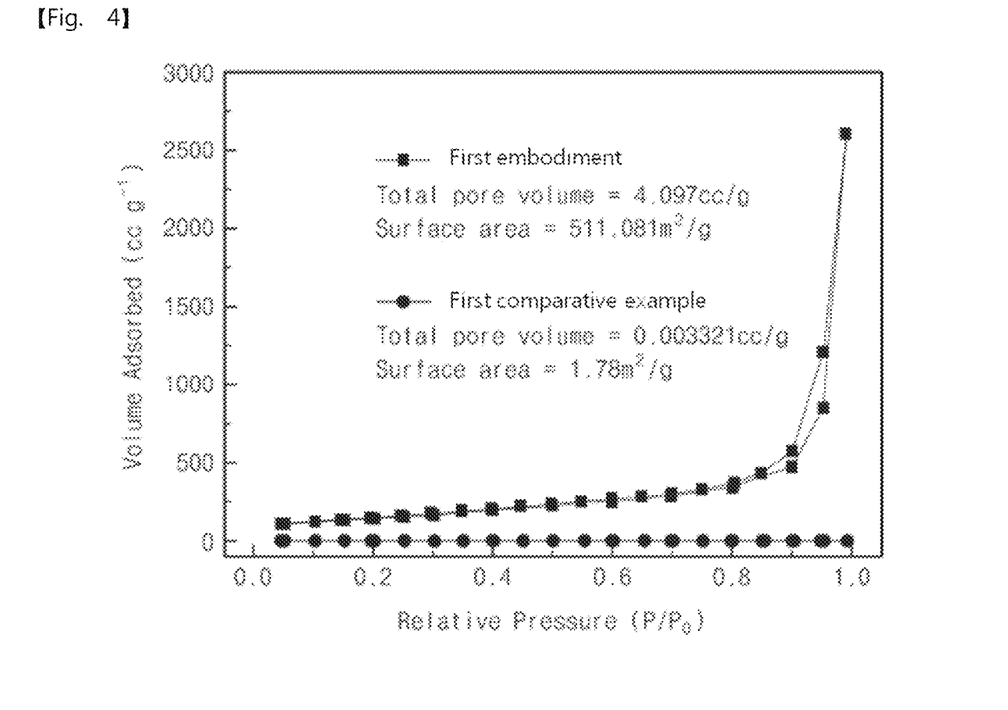
FIGS. 4 and 5 are graphs illustrating a surface area and a pore volume of a composite included in a lithium-air secondary battery according to some embodiments of the inventive concepts.
Figure 5:
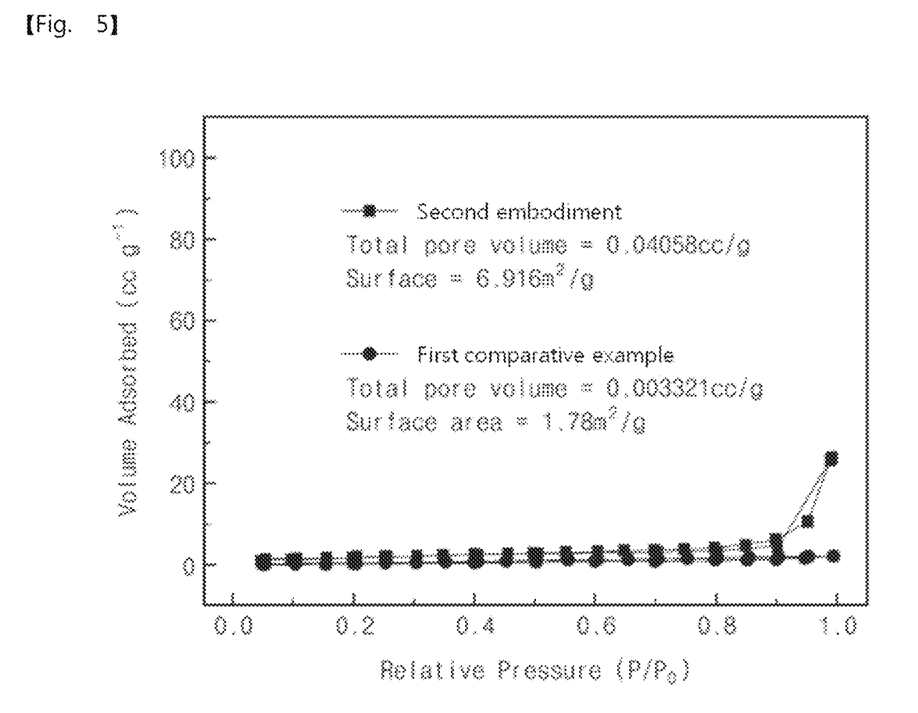

FIGS. 4 and 5 are graphs illustrating a surface area and a pore volume of a composite included in a lithium-air secondary battery according to some embodiments of the inventive concepts.

FIG. 4 illustrates the comparison of volume adsorbed of the composite of the molybdenum carbide and the carbon nanotube manufactured according to the first embodiment with volume adsorbed of the bulk molybdenum carbide powder manufactured according to the first comparative example. FIG. 5 illustrates the comparison of volume adsorbed of the composite of the molybdenum carbide and the graphite manufactured according to the second embodiment with the volume adsorbed of the bulk molybdenum carbide powder manufactured according to the first comparative example.

Surface areas and pore volumes of the composites according to the first and second embodiments were measured through BET measurement as shown in the following table 3. The surface areas and the pore volumes of the composites manufactured according to the first and second embodiments were much greater than those of the bulk molybdenum carbide powder manufactured according to the first comparative example.

In more detail, the surface area and the pore volume of the composite of the first embodiment were about 287 times and about 1234 times greater than the surface area and the pore volume of the bulk molybdenum carbide powder of the first comparative example, respectively. The surface area and the pore volume of the composite of the second embodiment were about 4 times and about 12 times greater than the surface area and the pore volume of the bulk molybdenum carbide powder of the first comparative example, respectively.

In the lithium-air secondary batteries manufactured using the composites manufactured through the ball-milling process and the carburization process according to the first and second embodiments, lithium oxide ($Li_2O_2$) may be easily and smoothly generated and decomposed in charging/discharging processes by the great surface area and the great pore volume. Thus, charge/discharge characteristics of the lithium-air secondary batteries may be improved.

TABLE 3

| Classification | Surface area | Pore volume |
| --- | --- | --- |
| First embodiment ($Mo_2C$/CNT) | 511.081 $m^2$/g | 4.097 cc/g |
| Second embodiment ($Mo_2C$/graphite) | 6.916 $m^2$/g | 0.04058 cc/g |
| First comparative example (Bulk $Mo_2C$) | 1.78 $m^2$/g | 0.003321 cc/g |

Figure 6:
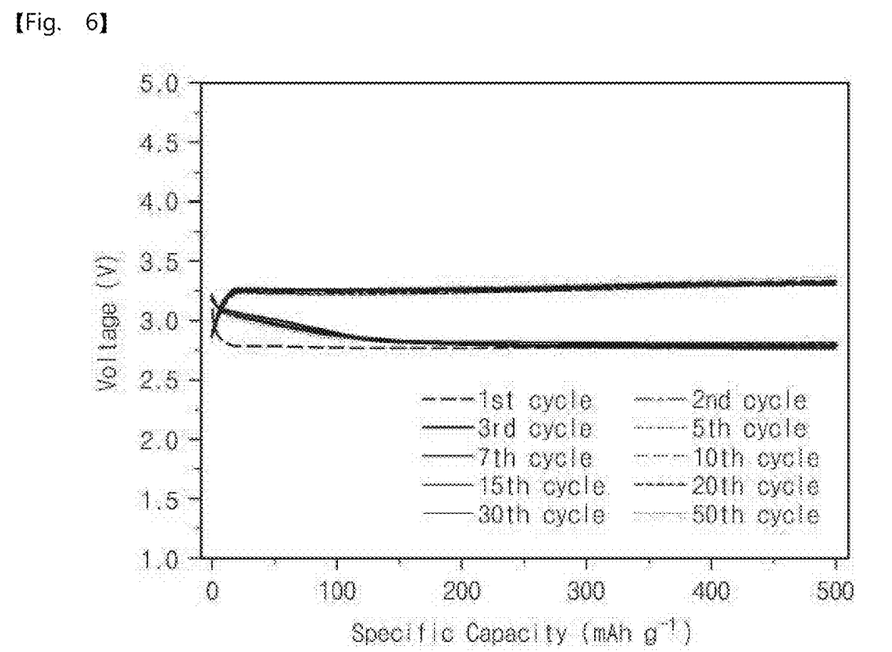
FIG. 6 is a charge/discharge graph of a lithium-air secondary battery according to some embodiments of the inventive concepts.
Figure 7:
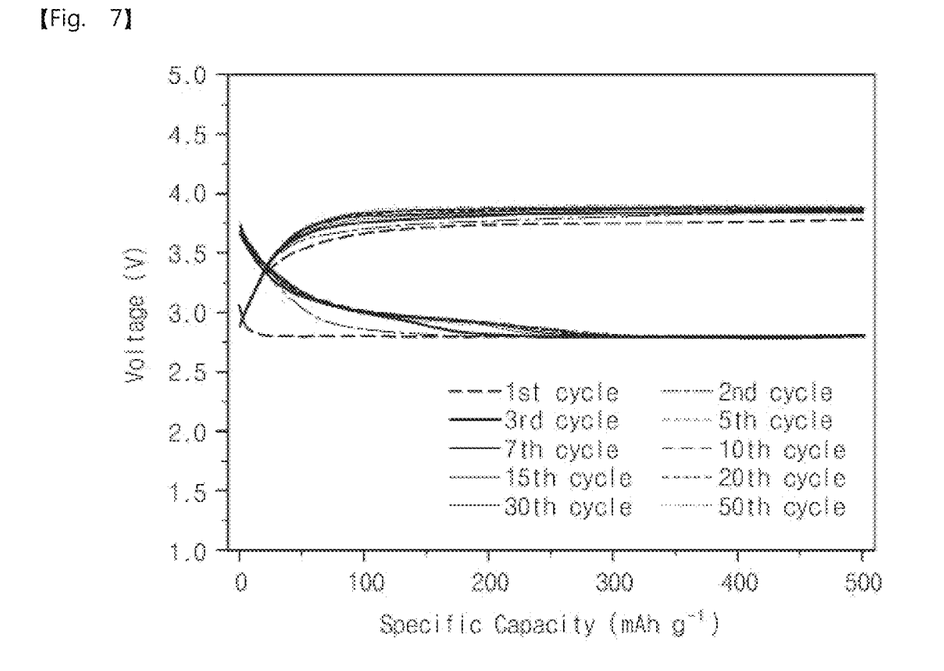
FIG. 7 is a charge/discharge graph of a lithium-air secondary battery according to a comparative example compared with an embodiment of the inventive concepts.

FIG. 6 is a charge/discharge graph of a lithium-air secondary battery according to some embodiments of the inventive concepts, and FIG. 7 is a charge/discharge graph of a lithium-air secondary battery according to a comparative example compared with an embodiment of the inventive concepts.

Referring to FIGS. 6 and 7, the lithium-air secondary battery of the first embodiment was charged and discharged 50 times under capacity and current conditions of 500 $mAhg^{-1}$ and 100 $mAg^{-1}$, and obtained charge/discharge characteristics of the lithium-air secondary battery of the first embodiment were illustrated in FIG. 6. The lithium-air secondary battery of the second comparative example was charged and discharged 50 times under the same capacity and current conditions, and obtained charge/discharge characteristics of the lithium-air secondary battery of the second comparative example were illustrated in FIG. 7.

A charging voltage of the lithium-air secondary battery including the positive electrode manufactured using the composite of the molybdenum carbide and the carbon nanotube according to the first embodiment is lower than that of the lithium-air secondary battery including the positive electrode manufactured using the carbon nanotube according to the second comparative example. Thus, a charge/discharge energy efficiency of the lithium-air secondary battery of the first embodiment is higher than that of the lithium-air secondary battery of the second comparative example. In other words, the positive electrode of the lithium-air secondary battery may be manufactured using the composite of the molybdenum carbide and the carbon structure, thereby improving the charge/discharge efficiency of the lithium-air secondary battery.

Figure 8:
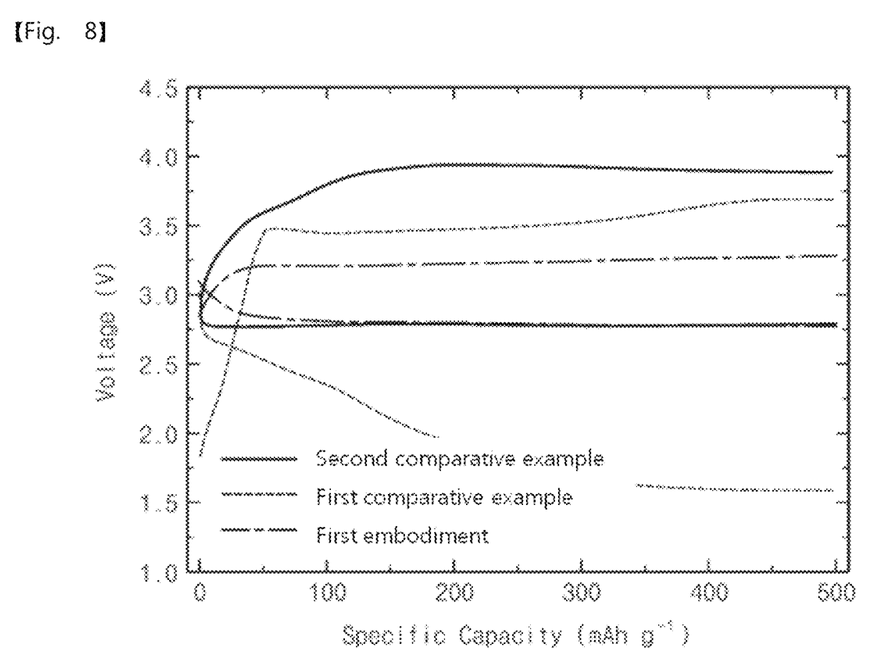
FIGS. 8 and 9 are graphs illustrating charge/discharge characteristics of lithium-air secondary batteries according to embodiments of the inventive concepts and comparative examples.
Figure 9:
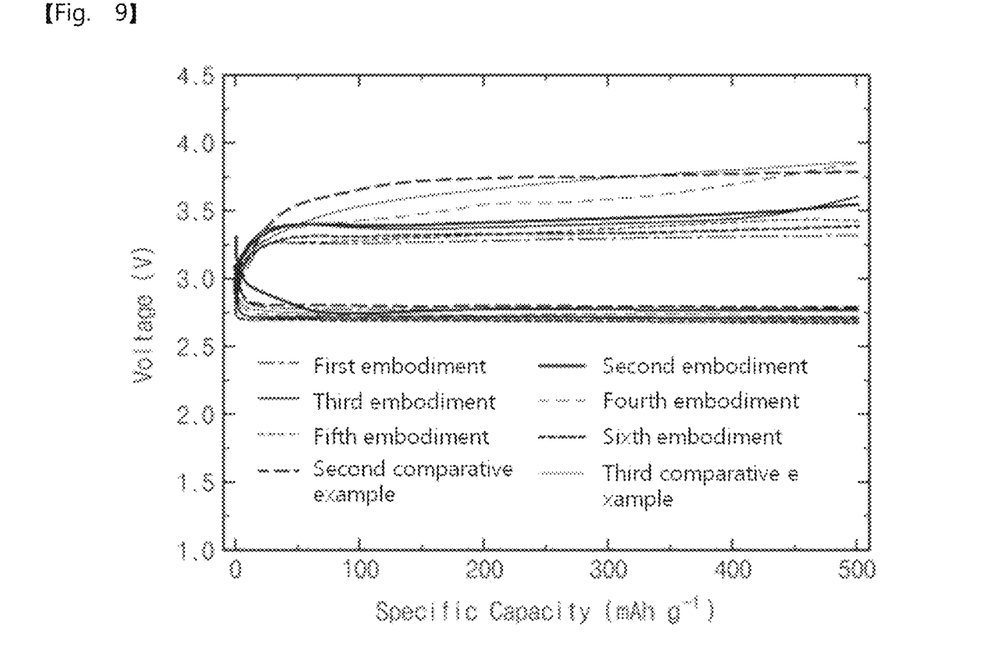

FIGS. 8 and 9 are graphs illustrating charge/discharge characteristics of lithium-air secondary batteries according to embodiments of the inventive concepts and comparative examples.

FIG. 8 illustrates the comparison of charge/discharge characteristics of the lithium-air secondary batteries according to the first and second comparative examples described above with charge/discharge characteristics of the lithium-air secondary battery according to the first embodiment under conditions of a current density of 100 mAg$^{-1}$ and a charge/discharge time of 5 hours. FIG. 9 illustrates the comparison of charge/discharge characteristics of the lithium-air secondary batteries according to the first to sixth embodiments with charge/discharge characteristics of the lithium-air secondary batteries according to the second and third comparative examples under the conditions of the current density of 100 mAg$^{-1}$ and the charge/discharge time of 5 hours.

Efficiencies of the lithium-air secondary batteries according to the embodiments and the comparative examples were measured as shown in the following table 4. Charge/discharge efficiencies of the lithium-air secondary batteries having the positive electrodes including the composites of the molybdenum carbide and the carbon structures according to the first to sixth embodiments are at least 10% higher than charge/discharge efficiencies of the lithium-air secondary batteries having the positive electrodes respectively including the bulk molybdenum carbide powder, the carbon nanotube, and the graphite according to the first, second and third comparative examples.

In other words, according to some embodiments of the inventive concepts, the ball-milling process may be performed on the molybdenum oxide and the carbon structure, the molybdenum oxide may be carburized with the carbon structure to manufacture the composite of the molybdenum carbide and the carbon structure, and the positive electrode of the lithium-air second battery may be manufactured using the composite. Thus, the charge/discharge efficiency of the lithium-air secondary battery may be significantly improved.

TABLE 4

| Classification | Efficiency (%) |
| --- | --- |
| First embodiment (Mo$_2$C/CNT) | 87.7 |
| Second embodiment (Mo$_2$C/Graphite) | 82.2 |
| Third embodiment (Mo$_2$C/Super P carbon) | 83.0 |
| Fourth embodiment (Mo$_2$C/Vulcan carbon) | 80.3 |

TABLE 4-continued

| Classification | Efficiency (%) |
| --- | --- |
| Fifth embodiment (Mo$_2$C/Graphene) | 84.3 |
| Sixth embodiment (Mo$_2$C/Activated carbon) | 83.9 |
| First comparative example (Bulk Mo$_2$C powder) | 52.6 |
| Second comparative example (CNT) | 74.7 |
| Third comparative example (Graphite) | 73.9 |

The lithium-air secondary battery according to the aforementioned embodiments of the inventive concepts may be applied to various applications. For example, the lithium-air secondary battery according to embodiments of the inventive concepts may be applied to an electric car to be described below.

Figure 10:
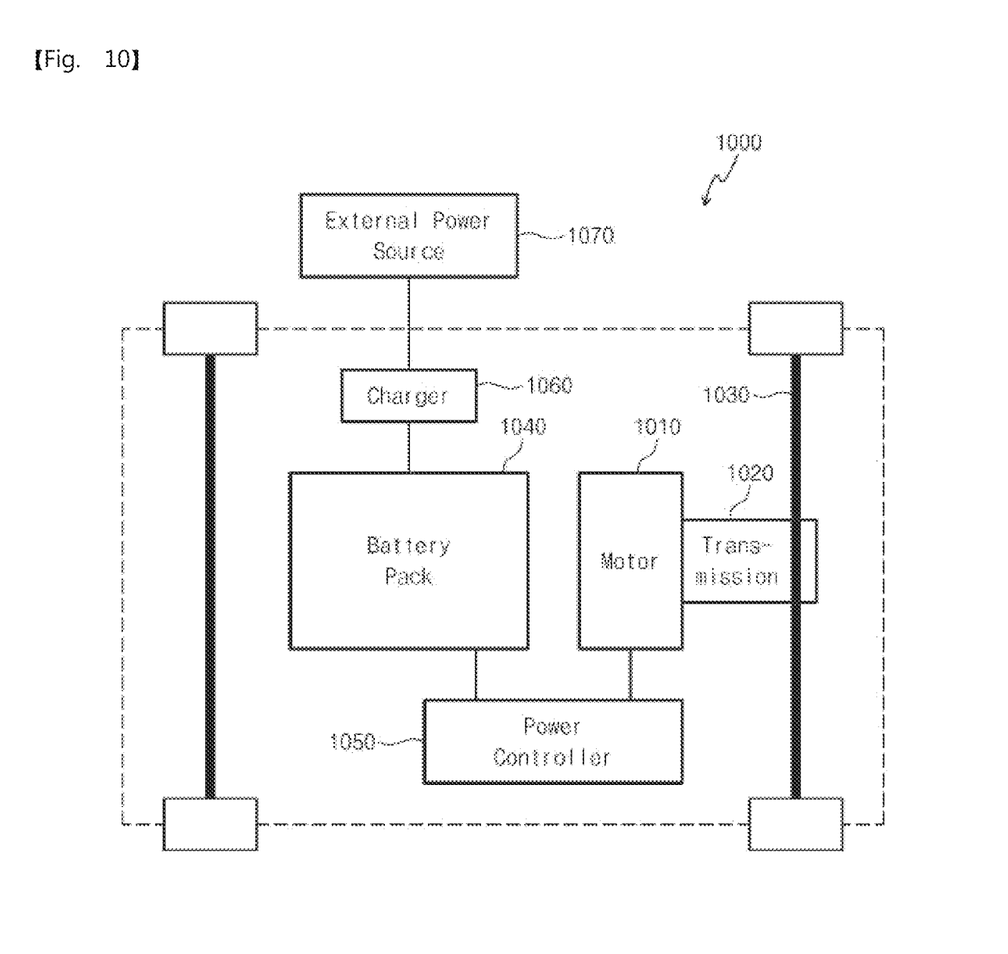
FIG. 10 is a schematic block diagram illustrating an electric car according to some embodiments of the inventive concepts.

FIG. 10 is a schematic block diagram illustrating an electric car according to some embodiments of the inventive concepts.

An electric car 1000 according to some embodiments of the inventive concepts may include a motor 1010, a transmission 1020, an axle 1030, a battery pack 1040, and at least one of a power controller 1050 or a charger 1060.

The motor 1010 may convert electric energy of the battery pack 1040 into kinetic energy. The motor 1010 may provide the converted kinetic energy to the axle 1030 through the transmission 1020. The motor 1010 may include a single motor or a plurality of motors. For example, in the event that the motor 1010 includes the plurality of motors, the motor 1010 may include a front motor supplying the kinetic energy to a front axle and a rear motor supplying the kinetic energy to a rear axle.

The transmission 1020 may be located between the motor 1010 and the axle 1030. The transmission 1020 may change the kinetic energy provided from the motor 1010 to meet a driving environment desired by a driver and may provide the changed kinetic energy to the axle 1030.

The battery pack 1040 may store electric energy provided from the charger 1060 and may provide the stored electric energy to the motor 1010. The battery pack 1040 may directly provide the electric energy to the motor 1010 and/or may provide the electric energy to the motor 1010 through the power controller 1050.

At this time, the battery pack 1040 may include at least one battery cell. In addition, the battery cell may include the lithium-air secondary battery according to the aforementioned embodiments of the inventive concepts. However, embodiments of the inventive concepts are not limited thereto. In certain embodiments, the battery cell may further include at least one of other various kinds of lithium-based secondary batteries. Meanwhile, the battery cell may mean an individual battery, and the battery pack may mean a battery cell assembly in which battery cells are connected to each other to have desired voltage and/or capacity.

The power controller 1050 may control the battery pack 1040. In other words, the power controller 1050 may control the batter pack 1040 to allow the power transmitted from the battery pack 1040 to the motor 1010 to have desired voltage, current and/or waveform. To achieve this, the power controller 1050 may include at least one of a passive power device or an active power device.

The charger 1060 may receive power from an external power source 1070 illustrated in FIG. 10 and may provide the power to the battery pack 1040. The charger 1060 may wholly control a charging state. For example, the charger 1060 may control on/off of charging and a charging rate.

Figure 11:
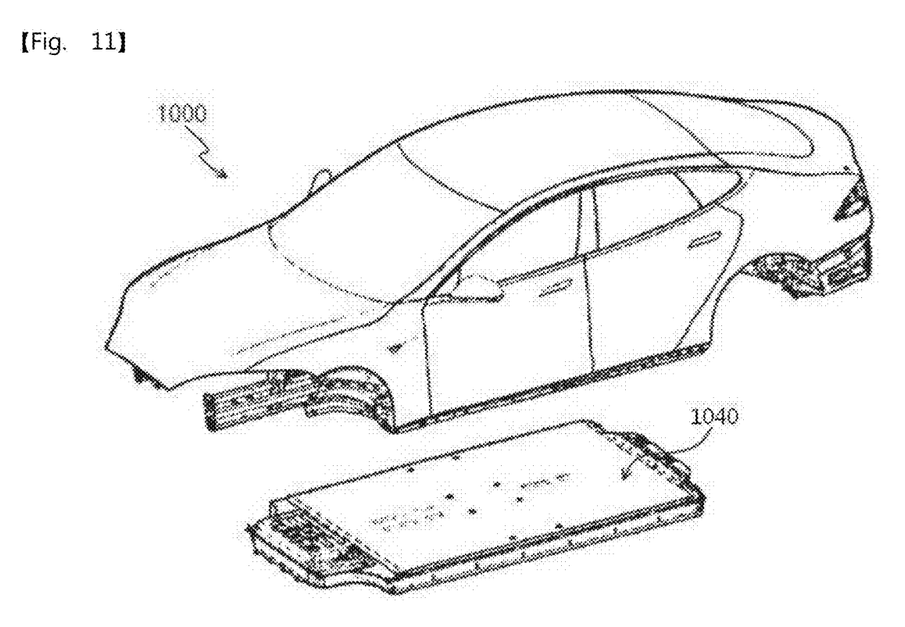
FIG. 11 is a perspective view illustrating an electric car according to some embodiments of the inventive concepts.

FIG. 11 is a perspective view illustrating an electric car according to some embodiments of the inventive concepts.

Referring to FIG. 11, the battery pack 1040 may be coupled to a bottom surface of the electric car 1000. For example, the battery pack 1040 may have a width in a width direction of the electric car 1000 and may have a shape extending in a longitudinal direction of the electric car 1000. In more detail, the battery pack 1040 may extend from a front suspension to a rear suspension. Thus, the battery pack 1040 may provide a space capable of packaging a larger number of battery cells. In addition, since the battery pack 1040 is coupled to and disposed at a bottom end of a car body, the center of gravity of the car body may be lowered to improve driving stability of the electric car 1000.

Figure 12:
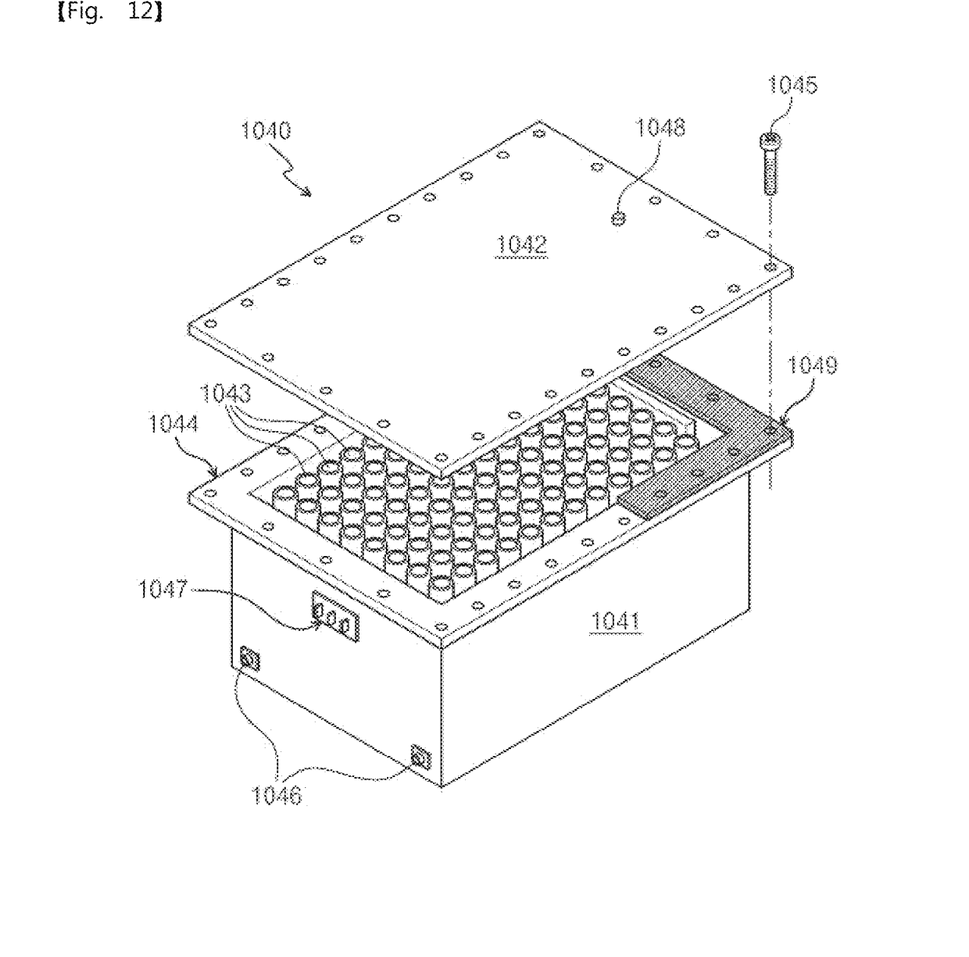
FIG. 12 is a perspective view illustrating a battery pack according to some embodiments of the inventive concepts.

FIG. 12 is a perspective view illustrating a battery pack according to some embodiments of the inventive concepts.

Referring to FIG. 12, the battery pack 1040 may contain a plurality of battery cells 1043.

The battery pack 1040 may include a lower housing 1041 and an upper housing 1042. The lower housing 1041 may include a flange 1044, and bolts 1045 may be fastened to the flange 1044 through holes formed in the upper housing 1042 to couple the lower housing 1041 to the upper housing 1042.

At this time, to improve stability of the battery pack 1040, the lower and upper housings 1041 and 1042 may be formed of a material capable of minimizing permeation of moisture and oxygen. For example, the lower and upper housings 1041 and 1042 may be formed of at least one of aluminum, an aluminum alloy, plastic, or a carbon compound. In addition, an impermeable sealant 1049 may be disposed between the lower housing 1041 and the upper housing 1042.

Furthermore, the battery pack 1040 may further include a component for controlling the battery cells 1043 or for improving stability of the battery cells 1043. For example, the battery pack 1040 may include a control terminal 1047 for controlling the battery cells 1043 disposed in the battery pack 1040. In addition, for example, the battery pack 1040 may include a cooling line 1046 for preventing thermal runaway of the battery cells 1043 or for controlling temperature of the battery cells 1043. Furthermore, for example, the battery pack 1040 may include a gas outlet 1048 for exhausting a gas in the battery pack 1040.

The lithium-air secondary battery according to some embodiments of the inventive concepts may be used in various fields such as portable mobile devices (e.g., a smart phone, a MP3 player, and a tablet personal computer), an electric car, and an energy storage system.

According to some embodiments of the inventive concepts, the positive electrode of the lithium-air secondary battery may include the composite in which the molybdenum carbide and the carbon structure are combined with each other. In addition, the ball-milling process may be performed on the molybdenum oxide and the carbon structure, and then, the composite may be manufactured by carburizing the molybdenum oxide with the carbon structure. Thus, manufacturing processes may be simplified to reduce a manufacture cost, and it is possible to provide the highly reliable lithium-air secondary battery with the improved charge/discharge efficiency and the method of manufacturing the same.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A method of manufacturing a lithium-air secondary battery, the method comprising:
   preparing molybdenum oxide and a carbon structure;
   pulverizing and mixing the molybdenum oxide, the carbon structure, and beads by performing a ball-milling process without a solution on the molybdenum oxide and the carbon structure;
   separating the beads from the pulverized and mixed molybdenum oxide and carbon structure; and
   directly after the beads are separated, thermally treating the pulverized and mixed molybdenum oxide and carbon structure to manufacture molybdenum carbide and a composite in which the molybdenum carbide is combined with the carbon structure.

2. The method of claim 1, wherein the thermal treating of the carbon structure and the molybdenum oxide is performed in an inert gas atmosphere.

3. The method of claim 1, further comprising:
   manufacturing slurry using the composite; and
   applying the slurry to a gas diffusion layer.

4. The method of claim 1, wherein the ball-milling process is performed on the molybdenum oxide and the carbon structure in an inert gas atmosphere.

5. A method of manufacturing a positive electrode of a lithium-air secondary battery, the method comprising:
   preparing molybdenum oxide and carbon nanotube;
   ball-milling the molybdenum oxide, the carbon nanotube, and beads without a solution to pulverize and mix the molybdenum oxide and the carbon nanotube;
   separating the beads from the pulverized and mixed molybdenum oxide and carbon nanotube;
   directly after the beads are separated, thermally treating the pulverized and mixed molybdenum oxide and carbon nanotube to manufacture molybdenum carbide and a composite in which the molybdenum carbide is combined with the carbon nanotube;
   mixing the composite with a binder to manufacture slurry; and
   applying the slurry to a gas diffusion layer.

6. The method of claim 5, wherein the molybdenum oxide is chemically carburized by the carbon nanotube to manufacture the molybdenum carbide.

7. The method of claim 5, wherein generation and decomposition of $Li_2O_2$ occurring in charging/discharging processes are accelerated by the composite.

8. The method of claim 5, wherein a surface area of the composite is equal to or greater than 500 $m^2$/g, and
   wherein a pore volume of the composite is equal to or greater than 4 cc/g.

9. The method of claim 5, wherein a diameter of the molybdenum carbide ranges from 20 nm to 100 nm.

* * * * *